United States Patent [19]

Lopez

[11] 3,997,028
[45] Dec. 14, 1976

[54] ENTERTAINMENT TABLE

[75] Inventor: Euphemia Lopez, Pacifica, Calif.

[73] Assignee: Lawrence Peska Associates, Inc., New York, N.Y. ; a part interest

[22] Filed: June 23, 1975

[21] Appl. No.: 589,789

[52] U.S. Cl. .............. 186/1 B; 186/1 D; 126/268; 312/306
[51] Int. Cl.² ........................................ E04H 3/04
[58] Field of Search .............. 186/1 R, 1 B, 1 D; 126/268, 276; 219/214, 218; 296/22, 24 A; 312/306, 252; 108/147; 165/48, 53, 56

[56] References Cited
UNITED STATES PATENTS

| | | | |
|---|---|---|---|
| 2,627,445 | 2/1953 | Lyon | 312/252 |
| 3,162,495 | 12/1964 | Swift | 186/1 R |
| 3,650,591 | 3/1972 | Longmire | 312/306 |
| 3,748,437 | 7/1973 | Keeshin | 126/268 |
| 3,886,346 | 5/1975 | Meyers | 165/48 |

Primary Examiner—George E. A. Halvosa
Assistant Examiner—Reinhard J. Eisenzopf

[57] ABSTRACT

Apparatus is disclosed for dispensing and serving hot and cold foods comprising a cabinet having either one or a plurality of compartments within the cabinet for holding food, heat exchange means mounted in the compartments of the cabinet and an elevator in each compartment for raising or lowering food out of or into each compartment.

1 Claim, 2 Drawing Figures

ENTERTAINMENT TABLE

SUMMARY OF THE INVENTION

The present invention relates to apparatus for dispensing and serving hot and cold foods and comprises a cabinet having either one or a plurality of compartments within the cabinet for holding food, heat exchange means mounted in the compartment and an elevator in each compartment for raising or lowering food out of and into each compartment.

DETAILED DESCRIPTION

In serving hot and cold foods while entertaining guests at home or at catered affairs the foods quickly come to room temperature unless adequate heating or refrigeration is provided for. The known methods of heating and refrigerating food served in this manner generally comprises having the food in a special heating dish such as a chafing dish or a special dish for cooling food such as a dish immersed in ice. Both methods of heating or cooling food are not entirely desirable since the food is always exposed so that it will eventually come up to room temperature when the fuel in the chafing dish is exhausted or the ice in the cooling dish melts. Additionally, exposed food could become unsanitary in some situations.

It is therefore an object of the present invention to overcome these and other difficulties encountered in the prior art. It is a further object of the invention to provide an entertainment table for dispensing hot and cold food items and which will also store hot and cold food in a manner that is efficient.

These and other objects have been achieved by the present invention which comprises apparatus for dispensing and serving hot and cold food and which will become more apparent by reference to the following disclosure and claims as well as the appended drawing.

Figure 1:
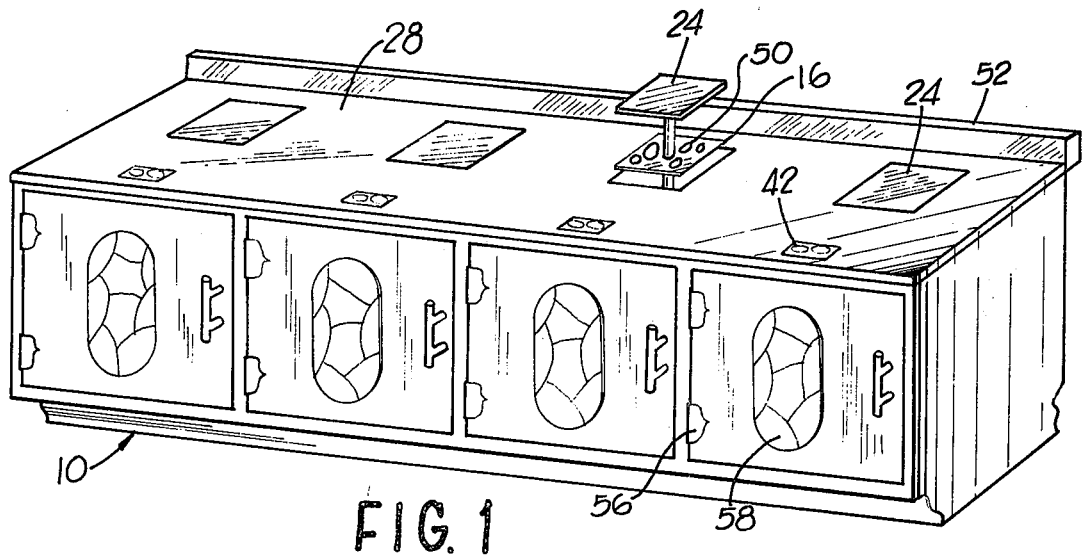
FIG. 1 is a perspective view of one embodiment the entertainment table of the present invention illustrating one of the elevators for raising and lowering food in and out of a compartment in a raised position.
Figure 2:
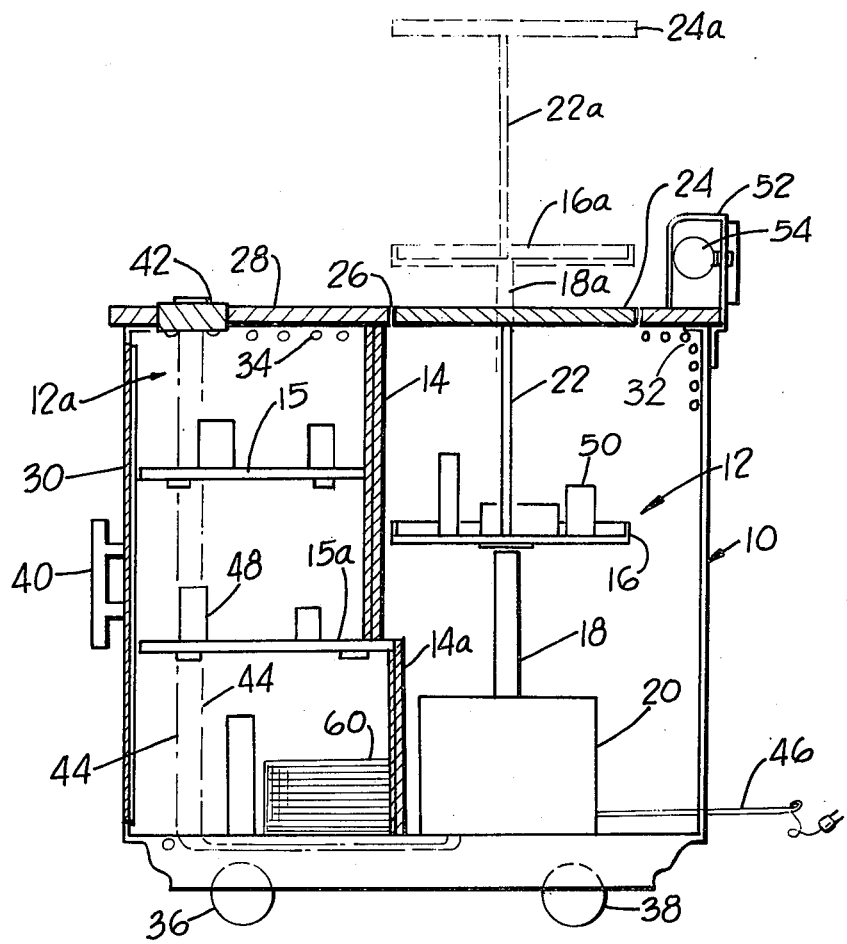
FIG. 2 is a side elevation in section of one embodiment of the entertainment table of the present invention.

Referring to FIGS. 1 and 2 an entertainment table is illustrated comprising a cabinet 10 having compartments 12 and 12a which may either be interconnected or separated as is shown in FIG. 2 by means of partitions 14 and 14a. Heat exchangers comprising heating or cooling coils 32 and 34 are provided, wherein the heating coils may be electric resistant heating coils or may be hollow heat conductive tubes carrying a heat exchange fluid. The cooling coils may similarly be thermo electric cooling devices known in the art or hollow conductive tubes also carrying a heat exchange fluid. In one embodiment of the present invention a heat pump 60 is provided which comprises a compressor and expansion chamber for a heat exchange fluid such as a fluorinated hydrocarbon. The fluid is compressed which concentrates the heat therein into a smaller volume of fluid and this warmed fluid is then circulated through tubes in a compartment to be heated after which it is led into the expansion chamber after having lost some of its caloric content. In the expansion chamber, the fluid is allowed to increase in volume and in so doing the heat contained therein is diluted over a greater volume of fluid whereupon the temperature of the fluid is reduced and then is circulated through cooling tubes in one of the compartments that contains food that is to be served cold. The process of passing the fluid through the heat pump is carried out continuously so that the heat from the compartment that is to be kept cold is constantly pumped into the compartment that is to be maintained warm. When only one compartment is used either the cooling or heating tubes can be placed in the compartment as the heat exchanger and the other placed outside of the compartment. Additionally other heating and cooling means may be employed. The compartments 12 and 12a are insulated so that there is minimal heat transfer to or from the compartment or its contents unlike the prior art wherein food that is to be kept hot or cold for any length of time was not generally kept in an insulated environment and there was consequently excessive heat transfer to the atmosphere.

Items of food 48 or 50 are stored in the compartment, food 50 being movable out of the compartment by means of telescoping rod 18 on which is mounted tray 16. Tube 18 is hydraulically operated by means of a hydraulic pump driven by an electric motor that is reversible, the pump and motor being housed in housing 20. Rod 22 secured to the top of tray 16 and the bottom of door 24 acts to move door 24 upwardly when tray 16 is extended in an upward direction by means of rod 18. A resilient gasket 26 slidingly seals the opening in counter top 28 or door 24. The gasket is fabricated from the same materials employed in gaskets that are used to seal household refrigerator doors, for example, polyvinyl chloride and its art known equivalents. Wheels 36 and 38 are provided at either end of cabinet 10 to facilitate moving the cabinet from place to place, and are optionally employed in the construction of the entertainment table of the present invention. A door 30 having handle 40 is provided for access to shelves 15 and 15a holding food item 48, and where compartments 12 and 12a are not separated by a partition, such as partition 14 access is also had to tray 16 holding food item 50. The reversible electric motor and the hydraulic pump operatively connected thereto and housed in housing 20 operates off of current supplied to it through power cord 46 and its operation controlled by means of reversing switch 42 connected to such motor through electrical conduits 44. Electric lights 54 are provided at the top of cabinet 10 to illuminate surface 28 when the entertainment table of the present invention is being used to dispense and serve food. The lights are recessed by providing transluscent closure 52 over these lights although a transparent closure could be used in its place.

The entertainment table of the present invention is preferably constructed so as to be a highly decorative and attractive article of furniture. Multi-color lights 54 may be employed to add the decorativeness and further the cabinet may have a marble top 28 overlaping a wood substrate, an onyx or black wood carved base, and textured jade glass or colored or tinted glass oval windows 58 in the doors 30, the latter preferably being carved wood doors mounted on fancy brass hinges 56 and which also have fancy brass handles 40.

In use, the entertainment table of the present invention has hot or cold items of food 48 and 50 stored in chambers 12 and 12a and heat exchangers 32 and 34 are operated to either cool or heat the food. When the food is ready to be served, telescoping rod 18 is extended upwardly by activating the aforementioned reversible electric motor and hydraulic pump operably connected thereto by manually activating switch 42 to a position to cause said rod 18 to be extended. Food 50 is then raised with the tray 16 to at least the height of top 28 and in some instances higher than the top 28 to present such food thus dispensed for serving either by a self service procedure or a method in which food service is provided by serving personnel. When the tray 16 is raised in the foregoing manner as further illustrated in the attached drawing by phantom configurations 16a, 18a, 22a and 24a and food removed therefrom, the tray 16 is lowered by manually activating switch 42 to a position that causes the electric motor to reverse and rod 18 to collapse on itself in a telescoping manner until door 24 is again flush with top 28 and sealed thereto through seal 26. When compartments 12 and 12a are interconnected food items may be loaded onto tray 16 through door 30 otherwise items of food 48 introduced into compartment 12a through door 30 have to be removed through said door.

Although the invention has been described by reference to some embodiments, it is not intended that it is to be limited thereby, but that certain modifications thereof are intended to be included as falling within the broad scope and spirit of the foregoing disclosure, the following claims and the appended drawing.

What is claimed is:

1. Apparatus for dispensing and serving hot and cold foods comprising cabinet means, thermally insulated compartment means within said cabinet means for holding food, said compartment means comprising a plurality of compartments, at least one of said compartments comprising a cooled compartment and at least one of said compartments comprising a heated compartment, heat pump means connected to heat exchange means in said cooled compartment and heat exchange means in said heated compartment for pumping heat from said cooled compartment into said heated compartment, first door means mounted in the front of said cabinet means for access to said compartment means, shelf means in said compartment means for holding food, said shelf means being accessible through said first door means, elevator means in said compartment means for raising and lowering food out of and into said compartment means, said elevator means comprising tray means for holding food, said tray means being mounted on telescoping vertical means, means for raising and lowering said telescoping means, second door means in combination with said elevator means for opening and closing said cabinet means through the top thereof when said elevator means is raised to present food for dispensing and serving and lowered to store food for subsequent use, said second door means positioned over and operatively connected to said tray means by means for opening said second door means when said tray means is moved upward and closing said second door means when said tray means is moved downward, said tray means being movable in an upward direction to at least the level of the top of said cabinet means.

* * * * *